Oct. 23, 1962
E. E. PONCEL ET AL
3,059,814
ACTUATOR FOR EMERGENCY WATER EQUIPMENT
Filed Nov. 9, 1959
2 Sheets-Sheet 1
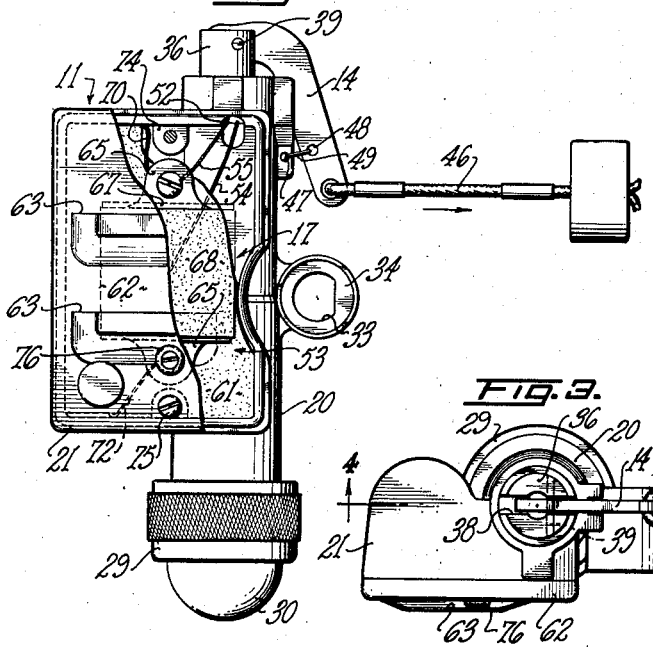
INVENTORS
EUGENE E. PONCEL
JACOB L. PAULY
BY
*Fulwider Mattingly & Huntley*
ATTORNEYS Oct. 23, 1962 E. E. PONCEL ET AL 3,059,814
ACTUATOR FOR EMERGENCY WATER EQUIPMENT
Filed Nov. 9, 1959 2 Sheets-Sheet 2
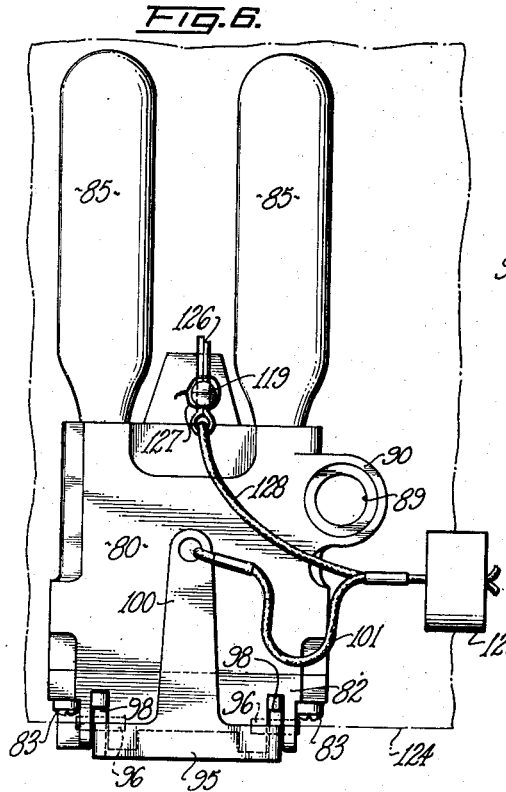
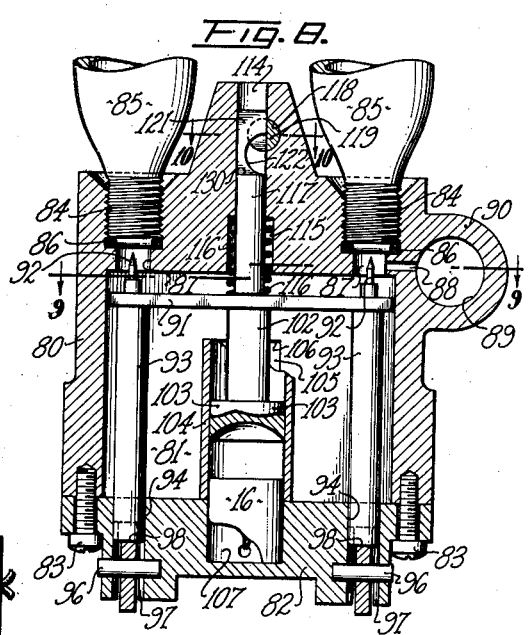
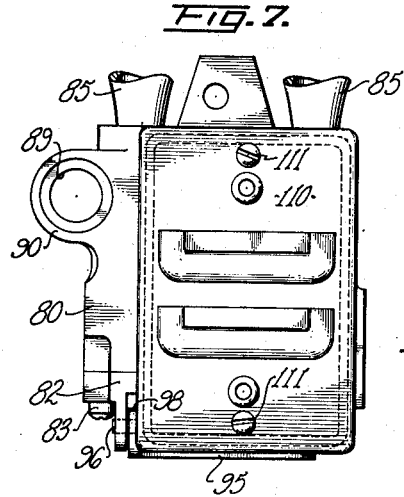
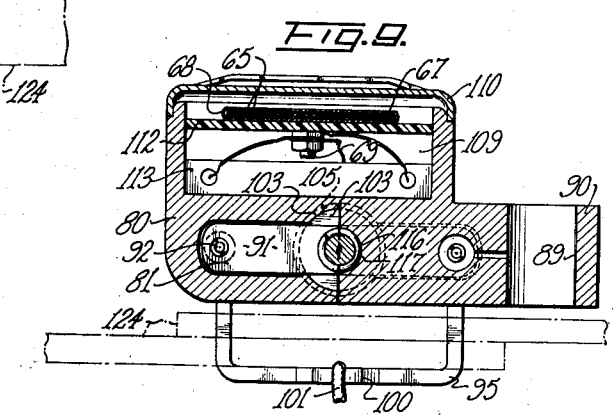
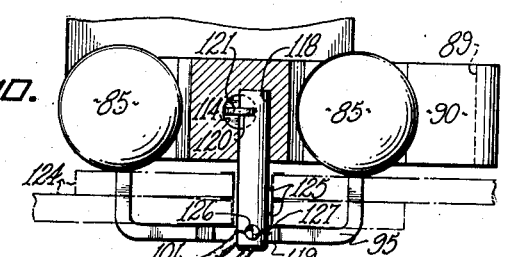
INVENTOR.
EUGENE E. PONCEL
JACOB L. PAULY
BY Fulwider Mattingly & Huntley
ATTORNEYS

United States Patent Office 3,059,814
Patented Oct. 23, 1962

3,059,814
ACTUATOR FOR EMERGENCY WATER EQUIPMENT
Eugene E. Poncel, 1716 Scott Road, Burbank, Calif., and Jacob L. Pauly, 9617 3rd Ave., Inglewood, Calif.
Filed Nov. 9, 1959, Ser. No. 851,577
6 Claims. (Cl. 222—5)

The present invention relates to emergency water equipment actuators, and more particularly to apparatus of this type that is automatically energized upon coming into contact with water.

A familiar example of emergency lifesaving equipment for water use is the "Mae West" inflatable life jacket, customarily worn by airmen. Our invention has to do with automatic actuators for this and similar types of equipment, and it is an object of our invention to provide an actuator responsive to water-immersion that actuates the equipment instantly upon contacting water. Thus, in the event that the person using the equipment is unconscious or otherwise disabled so as to prevent manual actuation of the equipment, the life jacket, raft, signal light or the like is automatically actuated.

Another object of the invention is to provide an actuator of this type that is in a constant state of readiness and will respond instantaneously upon contacting water, the actuator having an efficient organization of a minimum number of parts to minimize the possibilities of malfunctioning.

Yet another object of the invention is to provide a water-responsive actuator of this type that is energized instantly upon contacting the water so that the equipment is inflated before the wearer has sunk into the water.

A further object of the invention is to provide a highly miniaturized, lightweight actuator particularly adapted for use with inflatable life jackets worn in parachutes and incorporating both manual and automatic actuating means.

A still further object of the invention is to provide an actuator for an inflatable article that is packed in highly compressed condition under the flaps of a parachute or other pack and that when manually or automatically energized effects release of a fastener employed in holding the flaps together whereby the inflation can occur without resistraint from the fastener.

These and other objects and advantages of the invention will be apparent from the following description when taken in conjunction with the annexed drawings wherein:

FIGURE 1 is a plan view of a presently preferred embodiment of our actuator with parts broken away to show interior details of construction;

FIGURE 2 is a side elevational view;

FIGURE 3 is an end view;

FIGURE 4 is a sectional view taken on the line 4—4 of FIGURE 3 but with the switch means lifted out of the body to show its interconnection with the battery and pyrotechnic "squib";

FIGURE 5 is a schematic view of the circuit for energizing the actuator;

FIGURE 6 is a plan view of an alternate embodiment of our invention and showing flaps of a parachute pack in phantom outline;

FIGURE 7 is a partial plan view of the side of the actuator opposite the side seen in FIGURE 6;

FIGURE 8 is a partial sectional view along a plane of the actuator body intersecting the axes of the pair of gas cartridges;

FIGURE 9 is a sectional view taken along the line 9—9 of FIGURE 8; and

FIGURE 10 is a sectional view on the line 10—10 of FIGURE 8, showing details of the flap-releasing means.

Referring now to the drawings for the general arrangement of the invention, and in particular to FIGURE 4, the actuator includes a body 11, carbon-dioxide-gas cartridge 12 and a piercing piston 13. A lever 14 is pivotally mounted on the body and has a cam engagement means with the piston 13 for forcing the piston into piercing engagement with the cartridge 12 to release the gas therein, which is thereafter communicated through suitable conduits to an inflatable article. For automatically piercing the gas cartridge 12 the body 11 also encloses an electrical storage battery 15 for firing a pyrotechnic device 16, commonly called a "squib." A normally open switch means 17 is interposed in the circuit between the battery and squib to prevent firing of the squib except upon exposure of the switch means to either salt or fresh water.

More specifically, the body 11 comprises a relatively elongated cylindrical portion 20 and a somewhat rectangular portion 21. The cylindrical portion is divided by a wall 22 into a cartridge chamber 23 and a piston chamber 24 and these two chambers are intercommunicated by a bore 25 extending through the wall.

The gas cartridge 12 is of conventional construction, tapering at one end to a cylindrical neck 26 provided with an axially extending mouth normally sealed by a soft metal to contain the gas. At its inner end the cartridge chamber is counterbored, having a shoulder 27 to serve as a centering means to confine the neck 26 of the gas cartridge into substantially coaxial alignment with a piercing pin 28 formed on the confronting end of the piston.

At its outer end the cartridge chamber 23 is externally threaded to receive a nut 29 which in turn engages a circumferential flange on a herispherical cap 30. The gas cartridge 12 is thus held against a seat comprising one face of the wall 22 dividing the piston chamber and cartridge chamber. This seat is formed with a diametrically extending groove 31 so that after the cartridge 12 has been pierced the gas can escape therefrom into the annular space between the neck 26 of the cartridge and the counterbored portion of the cartridge chamber 23. An outlet 32 extends from this counterbored portion outwardly of the body to communicate with a passage 33 formed in a generally cylindrical boss 34, integrally formed on a side of the body 11. Although not shown, it will be understood that this passage is communicated through appropriate conduit means to the life jacket or other inflatable article.

The piercing piston 13 is reciprocably slidable in the piston chamber 24 and is normally held out of piercing engagement with the gas cartridge 12 by a coil spring 35. This spring is seated between confronting ends of the piston and the wall 22 and is held in compressed condition by a cap 36 threadedly engaged with the tapped open end of the piston chamber 24.

The cap 36 has a diametrically extending slot 38 in which one end of the manual actuating lever 14 is received and pivoted in the slot by means of a pin 39 mounted in the cap. A counterbore 40 centrally formed in the cap slidably supports a stem 41 which on its inner end drivingly carries a disc 42. The lever 14 is formed at one end with a cam edge 43 adapted for driving engagement with an enlarged head 44 formed on the stem 41 and the counterbore has an outwardly facing shoulder 45 limiting inward movement of the stem 41.

At its other end the lever 14 is connected to a lanyard 46. Confronting portions of the actuator body and the lever 14 are formed with bores 47 and 48, respectively, through which a segment of safety wire 49 is passed. The lever 14 is thus held against inadvertent manual actuation. However, upon a deliberate pull being exerted on the lanyard 46 the lever is pivoted, whereby its cam edge 43 forces the stem 41 and disc 42 inwardly in the piston chamber to force the piercing pin 28 of the piston into engagement with the gas cartridge 12.

It will be observed that the piston 13 is formed with a domed squib chamber 51 which is normally closed by the disc 42. Referring now to FIGURE 1, it will be observed that an opening 52 is formed within the actuator body 11 which communicates the piston chamber 24 and a switch and battery chamber 53 in order to pass a pair of conductor wires 54 and 55 for interconnecting the squib 16, battery 15 and the switch means 17. Referring now to FIGURE 4, it will be noted that a portion of the wall of the squib at one end is formed with an opening 56 to pass this pair of wires, and the wall of the squib chamber 51 is similarly formed with an opening 57 adapted to register with the squib wall opening to pass the same wires.

The chamber 53 includes a semi-cylindroid internal cavity 60 to seat the battery 15. The switch means includes an insulator base 61 which is substantially rectangular in configuration, being relieved where necessary to fit closely within the chamber 53 and the connecting wires for the circuit are disposed beneath the mounting base. This base, in turn, is held in place by a cover plate 62 having a plurality of lowered openings 63 permitting access of water to the interior of the actuator body.

Referring now to FIGURE 5, the switch means includes a pair of substantially rectangular conductor plates 65 each having a tab 66, the plates being disposed on opposite sides of a substantially rectangular wafer 67 of a porous and substantially incompressible dielectric material. This intermediate insulating wafer is preferably coated with salt crystals and the conductor plates 65 and wafer 67 are bound together by a piece of insulating tape 68 or other suitable fastening means. Preferably the wafer 67 is somewhat longer than the conductor plates 65 so as to protrude slightly beyond those ends of the plates which are not bound by the tape.

The switch base 61 centrally mounts a terminal stud 69 held out of electrical contact with the adjacent conductor plate 65 by the tape 68. A conductor 70 interconnects the stud and one terminal of the battery and the conductor 54 serves to electrically interconnect the stud and the squib 16.

The assembled sandwich of the pair of conductor plates 65 and wafer 67 is held onto the switch base 61 by a pair of terminal screws 71 each of which extends through a bore in one of the tabs of the conductor plates as well as through the switch base. These terminal screws protrude beyond the under side of the switch base 61 and are provided with suitable fasteners to hold the switch means 17 in position on the surface defining rectangular portion 21 of the actuator body and also to provide a terminal for one end of a conductor wire. One conductor 72 extends from one of the terminal screws to the opposite terminal of the battery while the other terminal screw is connected to one end of the conductor 55 whose other end is connected to the squib 16.

The actuator body in the chamber 53 is formed with a pair of opposite-end bosses 74 each of which is tapped to receive a screw 75 to hold the cover plate 62 on the body. These bosses also provide seats for the opposite ends of the switch base 61 to hold it against displacement. The cover plate 62 is also provided with a pair of grommeted openings 76 each of which registers with one of the terminal screws 71 in order to admit test probes for periodically checking the condition of the battery, the probes thus being able to bypass the water switch means.

The actuator is normally contained in a suitable pocket of a parachute pack or life raft but with the cover plate 62 and lanyard 46, at least, being exposed. Manual operation of the actuator has already been described. In describing automatic operation let it be assumed that the actuator is incorporated in a parachute pack, the pack having a "Mae West" life jacket. Assume a pilot to have parachuted from an aircraft over water, the pilot there-after having lapsed into unconsciousness. As the pilot enters the water, whether it be salt water or fresh water, the water enters the louvered openings 63 and saturates the wafer 67 of the switch means. The circuit shown schematically in FIGURE 5 is thereby closed instantly, causing explosion of the squib 16. The gas released by this explosion drives the piercing piston 13 towards the gas cartridge 12 which is pierced by the pin 28 and gas then escapes from the cartridge through the diametrical groove 31, outlet 32 and ultimately through the passage 33 for inflating the "Mae West." After piercing of the gas cartridge 12 has occurred the spring 35 causes the pin to move out of the way of the opening formed in the gas cartridge so that the gas freely escapes. The force of the escaping gas will also aid in retraction of the pin 28.

Another embodiment of our invention is shown in FIGURES 6 through 10, this form of actuator being adapted to effect release of a fastener employed in holding together flaps of a parachute pack or the like under which an inflatable article is tightly packed in compressed condition.

This actuator has a substantially rectangular housing 80 formed with a chamber 81 whcih opens into the lower end of the housing. An elongated cap 82 is provided for closing the chamber 81 and is detachably held in place on the housing by a pair of fasteners 83.

At its upper end the housing is formed with a pair of counterbores 84, each of which is tapped to receive a complementarily threaded neck of a gas cartridge 85. An elastomeric O-ring seal 86 is seated on the shoulder of each counterbore against which the gas cartridges 85 are abutted so that upon puncturing of the cartridges escaping gas is prevented from escaping from the housing and is directed into the housing chamber 81 through reduced-diameter portions 87 of the counterbores serving to establish communication of the chamber 81 and the cartridges. Communication between the chamber 81 and the device to be inflated is established through an orifice 88 extending from one of the counterbores 84 into a bore 89 formed coaxially in a boss 90 on one side of the housing, this bore being adapted to receive an end of a suitable conduit which conducts the gas to the article to be inflated.

For puncturing the cartridges 85 a substantially rectangular cross-bar 91 is mounted in the chamber 81 and on the side thereof confronting the cartridges carries a pair of piercing pins 92 each of which is aligned with a cartridge. On the other side of the cross-bar from the piercing pins 92 and in coaxial alignment with the piercing pins the cross-bar has a pair of plungers 93 each of which is slidably seated in a bore 94 formed in the cap 82.

For manually actuating the plungers 93 a U-shaped bail 95 is mounted in the cap 82. This bail has a pair of arms whose free ends are pivotally mounted by means of pins 96 within a pair of slots 97 formed in the cap 82, these slots opening into the plunger-supporting bores 94. As is shown in FIGURE 6, the pair of plungers 93 protrude into the slots 97 and the free ends of the bail 95 have cam edges 98 to translate pivotal movement of the bail into piercing movement of the pins 92 carried on the opposite ends of the plungers.

The arms of the bail 95 extend outwardly from one side of the housing 80 so that the web portion of the bail is offset from that side of the housing. This web portion carries an integrally formed upstanding actuating lever 100 and one lead 101 of a double-leaded lanyard is connected to the free end of the lever.

Midway between the plungers 93 the cross-bar 91 mounts a piston rod 102 which terminates at its lower end in a piston head 103. A cylinder 104 for the piston is provided within the housing chamber 81 by a cylindrical member seated within a pair of confronting grooves 105 formed in interior opposite walls of the chamber 81. These grooves have the same length as the cylinder 104 and open into the lower end of the housing so that the cylinder is seated between a downwardly facing shoulder 106 of each of these grooves and the cap 82. The cap, in turn, is provided with a squib pocket 107 coaxially aligned with the cylinder 104, the squib 16 being of a length such that when seated in this pocket is protrudes upwardly beyond the cap 82 and into the cylinder 104. The combustion chamber for the squib 16 is thus defined between the squib and a substantially hemispherically domed lower face of the piston 103.

The battery and water switch for actuating the squib may be disposed in a compartment 109 formed integrally with the housing 80, or they may be disposed in a housing of their own spaced from and distinct from the housing. Thus, the pair of leads of the squib 16 shown in FIGURE 8 may pass through an opening formed in the side of the housing cap and extend to a separate housing enclosing the battery and water switch means; or, the leads may extend into the compartment 109 shown in FIGURE 9. In either case, the separate housing or compartment has one wall formed with an inlet through which salt or fresh water will have access to the water switch for closing the circuit and actuating the squib.

In the illustrated embodiment the battery and waterswitch compartment 109 is formed integrally with the housing 80 and is closed on one side by the louvered cover 110. This cover is held in place by a pair of screws 111 which threadedly engage suitable bosses of the type illustrated in FIGURE 1, these bosses also being adapted to provide a seat for an insulating switch base 112. This base mounts substantially the same switch as is shown in FIGURES 1 through 4 comprising the pair of conductor plates 65 having the wafer 67 therebetween, the whole being held in sandwich relationship by the tape 68 mounted on the switch base by the stud 69. A battery 113 in the chamber is connected to the squib 16 and the switch in the same manner as illustrated in FIGURE 4.

The housing 80 is formed with a central counterbore 114 extending from the top downwardly into communication with the chamber 81. The enlarged-diameter lower-end portion 115 of this counterbore is adapted to seat one end of a coil spring 116, the other end of which is seated against the upper face of the cross-bar 91. A rod 117 is mounted on the upper face of the cross-bar coaxially with the piston rod 102 and is slidably seated in the smaller-diameter portion of the counterbore.

At its upper end the housing 80 is formed with another bore 118 which intersects the counterbore 114 and is adapted to seat in its blind end a safety pin 119. This pin is formed with a diametrically extending slot 120 adapted to receive a flat head 121 of the rod 117. It will be observed that this bore 118 is offset from the counterbore 114 and that the flat head of the rod 117 is formed with a semicircular notch 122 adapted to pass the full diameter of the safety pin 119 therethrough when the notch is moved into registration with the pin.

In FIGURES 9 and 10 a pair of overlapping flaps 124 of a parachute pack or the like are shown in phantom outline. This pair of flaps is disposed inside the lever 100 of the manual actuator bail, and the lower margins of the pair of flaps rest on the upwardly facing edge of the bail arms. The flaps 124 are formed with a pair of alignable openings 125 adapted for mounting on the protruding end of the safety pin 119, and a straight cotter 126 is passed through a suitable bore formed in the outer end of the safety pin for retaining the flaps thereunder. As is shown in FIGURE 6, a light safety wire 127 is passed through the cotter 126 and around the extremity of the safety pin. This cotter is connected to one end of a lead 128 of the double-leaded lanyard and both of the leads of the lanyard terminate at their other ends in a knob 129.

For manual actuation, the knob 129 of the lanyard must be pulled in a direction to pivot the bail. The pair of leads 101 and 128 of the lanyard are approximately of the same length and, accordingly, on pulling of the knob downwardly the lead 128 is first stretched taut in order to break the safety wire 127 and pull the cotter 126 out of the safety pin 119. Continued pulling of the knob 129 pivots the bail 95 to cam the pair of plungers 93 upwardly in the housing in order to pierce the cartridges 85.

The article to be inflated is packed under the parachute pack flaps, i.e., on the same side of the flaps 124 as the actuator, and the entire package is very tightly compressed. Therefore, immediately upon release of the cotter 126 the compressed condition of the article causes the flaps 124 to pop off of the safety pin 119 and the article can then be readily inflated without restraint from the flaps.

In the event that manual actuation is not possible, the water switch permits closing of the squib-actuating circuit upon contact with the water in the manner previously described. When the squib 16 is actuated the piston 103 is forced upwardly in the cylinder 104, causing the flat head 121 of the rod 117 to move upwardly until the notch 122 registers with the safety pin 119. The shoulder 130 defined by the junction of the flat head 121 and the cylindrical portion of this rod causes the rod to stop with the notch in registration with the pin. Upon such registration the compressed condition of the article under the flaps 124 exerts its force on the flaps and against the cotter 126 so that the safety pin 119 is withdrawn through the notch 122 of the flat head 121. Concurrently, the piercing pins 92 cause opening of the cartridges 85 to permit the gas to escape for inflating the life raft or life belt.

It will be understood that the invention is not to be limited to the details herein shown and described, except as defined in the appended claims.

We claim:

1. An emergency-equipment actuator comprising: a body having coaxially aligned cartridge and piston chambers; a reciprocable piston in said piston chamber and having a cartridge-piercing pin confronting said cartridge chamber, said chambers being communicated by an opening to pass said pin into said cartridge chamber; spring means in said body to hold said piston and pin against cartridge-piercing movement; a pyrotechnic device within a cavity formed in the end of said piston opposite to said pin; stop means at one end of the piston chamber against which said piston is biased by the spring means; a lever pivotally mounted on said body; a means in engagement with said piston and unidirectionally drivingly engageable by said lever to translate pivotal movement of said lever in one direction into movement of said piston and pin in piercing direction; and electrical means for energizing said pyrotechnic device including a pair of spaced-apart conductor elements in said body abutting a water-penetrable insulator, said body having a water inlet to establish communication with said insulator whereby water can penetrate said insulator to electrically connect said conductor elements for energizing said pyrotechnic device.

2. An emergency-equipment actuator comprising: a body having coaxially aligned cartridge and piston chambers; a reciprocable piston in said piston chamber having a cartridge-piercing pin integrally formed thereon and confronting said cartridge chamber, said chambers being communicated by an opening to pass said pin into said cartride chamber; yieldable means in said body to hold said piston against cartridge-piercing movement; a pyrotechnic device within a cavity formed in the end of said piston opposite to said pin; a disc seated at one end of said piston chamber and closing the open end of said cavity of said piston and against which said piston is biased by said yieldable means and having a driving stem, coaxially aligned with said chambers, that protrudes outwardly of said body; a lever pivotally mounted on said body having a cam edge engageable with the protruding end of said stem to translate movement of said lever in one direction into inward movement of said disc to move said piston in piercing direction; and electrical means for energizing said pyrotechnic deveice including a pair of spaced-apart conductor elements in said body abutting a water-penetrable insulator, said body having a water inlet to establish communication with said insulator whereby water can penetrate said insulator to electrically connect said conductor elements for energizing said pyrotechnic device.

3. An emergency-equipment actuator comprising: a body having coaxially aligned cartridge and piston chambers separated from one another by a dividing wall formed with a central opening to establish communication between said chambers, said body also having another chamber adjacent to said aligned chambers; a removable cap for closing the outer end of said cartridge chamber and for holding a mouth of a gas cartridge seated on said dividing wall, said wall being formed with a diametrically extending slot to establish communication between the mouth of said cartridge and the annular space between the neck of said cartridge and the surrounding area of said cartridge chamber, said body also having an outlet from said annular space for conducting gas outwardly of said body; a reciprocable piston in said piston chamber having an integrally formed cartridge-piercing pin coaxially mounted thereon and confronting said cartridge chamber for passage of said pin through said opening of said dividing wall; a spring in said piston chamber interposed between said dividing wall and the confronting end of said piston to normally bias said piston against cartridge-piercing movement of said pin; a squib disposed within a cavity formed in the end of said piston opposite to said pin, said squib and piston having aligned openings formed in portions of the walls thereof disposed in registration with an opening formed in said body to establish communication between said other chamber and said pair of aligned chambers whereby a pair of conductors can extend from said squib into said other chamber; a disc seated at one end of said piston chamber and closing the open end of said cavity of said piston and against which said piston is biased by said spring and having a driving stem coaxially aligned with said aligned chambers that protrudes outwardly of said body; a lever pivotally mounted on said body having a cam edge engageable with the protruding end of said stem to translate movement of said lever in one direction into inward movement of said disc to move said piston in piercing direction; and electrical means for energizing said squib including a battery and a water switch disposed in said other chamber of said body in a circuit with said squib, said switch comprising a pair of conductor plates abutting opposite sides of a water-penetrable dielectric wafer normally preventing closing of said circuit, said body over said other chamber having a cover plate formed with a plurality of louvers to allow water to enter said other chamber to penetrate said wafer for closing said circuit to energize said squib.

4. An emergency-equipment actuator for enabling inflation of emergency equipment packed in a compressed condition beneath flaps of a parachute pack or the like comprising: a body having a cartridge support; a reciprocable cartridge-piercing means within said body; a lever pivotally mounted on said body and having a cam engagement with said piercing means to translate movement of said lever in one direction into piercing movement of said piercing means; a piston chamber in said body for a reciprocable piston having driving engagement with said piercing means; means yieldably holding said piercing means against cartridge-piercing movement; pyrotechnic means in said chamber for moving said piston in cartridge-piercing direction against the force of said yieldable means; a first rod slidably mounted in a bore of said body and carried by said piercing means; a second rod in another bore of said body and having one end protruding from said body, said first and second rods adapted to each other to be latched together at one position of the first rod and to be unlatched upon movement of the first rod to another position when said piercing means is actuated by said lever or by said pyrotechnic device; a pin detachably mounted on the protruding end of the second rod to retain flaps of the parachute pack or the like; and a lanyard having one lead connected to said pin and another lead connected to said lever to first remove said pin and then pivot said lever in response to pulling on said lanyard.

5. An emergency-equipment actuator for enabling inflation of emergency equipment packed in a compressed condition beneath flaps of a parachute pack or the like comprising: a body having a pair of cartridge supports; a pair of plungers in said body held in alignment with said pair of supports by a cross-bar, said plunger on the side of aid bars facing said supports having piercing ends; a pivotal bail on said body whose arms at their ends have camming engagement with ends of said plungers to translate movement of said bail into piercing movement of said plungers; a piston chamber in said body having a reciprocable piston drivingly engaged to said cross-bar; pyrotechnic means in said chamber under said piston for moving said piston in cartridge-piercing direction; electrical means for energizing said pyrotechnic means including a pair of spaced-apart conductor elements abutting a water-penetrable insulator, whereby water can penetrate said insulator to electrically connect said conductor elements for energizing said pyrotechnic means; spring means in said body opposing piercing movement of said plungers; a first rod carried by said crossbar that is slidable in a bore of said body; and a second rod in another bore of said body and having one end protruding from said body, the first and second rods adapted to each other to be latched together at one position of the first rod and to be unlatched upon movement of the first rod to another position when said plungers and crossbar are actuated by said lever or by said pyrotechnic means.

6. An actuator as set forth in claim 5 wherein a flat head on the first rod is engaged by a diametral slot formed in the inner end of the second rod, said head having a substantially semi-circular opening to release the second rod when said opening registers with the second rod, the first rod having a shoulder substantially tangent to one end of said semi-circular opening to arrest movement of the first rod by contacting the second rod when said opening registers with the second rod.

References Cited in the file of this patent

UNITED STATES PATENTS

| Re. 20,047 | Heigis | July 28, 1936 |
| 1,236,381 | Rogers | Aug. 7, 1917 |
| 1,648,197 | Roodhouse | Nov. 8, 1927 |
| 1,956,494 | Dagnall et al. | Apr. 24, 1934 |
| 2,028,651 | Dagnall et al. | Jan. 21, 1936 |
| 2,114,301 | Harrigan | Apr. 19, 1938 |
| 2,284,650 | Grant | June 2, 1942 |
| 2,441,011 | Dodelin | May 4, 1948 |
| 2,463,191 | MacKenzie | Mar. 1, 1949 |
| 2,687,721 | Ellison | Aug. 31, 1954 |
| 2,722,342 | Fox | Nov. 1, 1955 |
| 2,780,398 | Sandgren | Feb. 5, 1957 |
| 2,891,478 | Dodge et al. | June 23, 1959 |

FOREIGN PATENTS

| 540,783 | France | Apr. 22, 1922 |